United States Patent
Kumada et al.

(10) Patent No.: US 8,604,707 B2
(45) Date of Patent: Dec. 10, 2013

(54) POWER SUPPLY

(75) Inventors: Kazuhiro Kumada, Hyogo (JP);
 Yosikazu Kado, Hyogo (JP); Satoru Nagata, Hyogo (JP); Kazuhiro Nisimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 79 days.

(21) Appl. No.: 13/449,584

(22) Filed: Apr. 18, 2012

(65) Prior Publication Data

US 2012/0268028 A1 Oct. 25, 2012

(30) Foreign Application Priority Data

Apr. 19, 2011 (JP) ................................. 2011-093305

(51) Int. Cl.
 *H05B 37/02* (2006.01)
(52) U.S. Cl.
 USPC ............. 315/226; 315/219; 315/291; 315/307
(58) Field of Classification Search
 USPC ............. 315/209 R, 219, 224–226, 246, 268, 315/272, 273, 276, 279, 287, 291, 307
 See application file for complete search history.

(56) References Cited

U.S. PATENT DOCUMENTS

| 5,537,008 A | * | 7/1996 | Matsuda et al. | ........... | 315/200 R |
| 5,663,613 A | * | 9/1997 | Yamashita et al. | ............ | 315/308 |
| 6,727,661 B2 | * | 4/2004 | Kominami et al. | ........ | 315/209 R |
| 2001/0030514 A1 | * | 10/2001 | Takahashi et al. | ............ | 315/219 |

FOREIGN PATENT DOCUMENTS

JP          2001-178137          6/2001

* cited by examiner

*Primary Examiner* — James H Cho
(74) *Attorney, Agent, or Firm* — Bacon & Thomas, PLLC

(57) ABSTRACT

A power supply includes: a step-down chopper unit for stepping down a DC voltage from a DC power source to a voltage required for lighting; and a dimming control unit which dims the light source by alternately repeating a switching ON period during which a drive signal having a frequency higher than that of the dimming signal is supplied to the switching element and a switching OFF period during which the supply of the drive signal to the switching element is stopped. Further, the power supply includes an inrush current prevention unit for preventing an inrush current occurring when the DC power source is turned on, and a compensation unit which applies a drive voltage to the thyristor in the switching OFF period.

6 Claims, 8 Drawing Sheets

POWER SUPPLY

FIELD OF THE INVENTION

The present invention relates to a power supply which supplies lighting power to a load having a light emitting diode.

BACKGROUND OF THE INVENTION

Conventionally, there is known a DC power supply serving as a DC power source for various electronic devices, as disclosed in, e.g., Japanese Patent Application Publication No. 2001-178137. The disclosed DC power supply, as illustrated in FIG. 8, includes mainly an AC power source 100, a full-wave rectifier 101 for rectifying an AC power source, and a step-up chopper circuit 102 for stepping up the voltage rectified by the full-wave rectifier 101. Further, a capacitor 103 is provided between the full-wave rectifier 101 and the step-up chopper circuit 102, thereby removing noise.

The step-up chopper circuit 102 includes, as main components, a choke coil 102A, a diode 102B, a switching element 102C, a control circuit 102D for controlling an ON/OFF interval of the switching element 102C, and an electrolytic capacitor 102E for smoothing an output. Further, in the DC power supply shown in FIG. 8, a DC voltage obtained by rectifying the AC voltage by the full-wave rectifier 101 is stepped up to a predetermined voltage by the step-up chopper circuit 102.

In the conventional example, there is further provided an inrush current prevention circuit 104 for limiting an inrush current occurring when the AC power source 100 is turned on. As the inrush current prevention circuit 104, there is used a circuit in which a resistor 104A and a thyristor 104B are connected in parallel at an output side of the full-wave rectifier 101. Further, a positive voltage is applied between the gate and cathode of the thyristor 104B from one winding of the choke coil 102A included in the step-up chopper circuit 102.

The inrush current prevention circuit 104 is operated as follows. First, the AC power source 100 is turned on to operate the DC power supply. At this point, since no drive voltage is applied between the gate and cathode of the thyristor 104B, all of the current flowing into the inrush current prevention circuit 104 is supplied to the step-up chopper circuit 102 via the resistor 104A.

Further, when a voltage is applied to the step-up chopper circuit 102, the switching element 102C is turned on by the control circuit 102D and the energy begins to accumulate in the choke coil 102A. At this point, the thyristor 104B starts to operate and a path of the current flowing through the inrush current prevention circuit 104 is switched from a path passing through the resistor 104A to a path passing through the thyristor 104B.

Furthermore, in a case where a voltage is applied to a light source including a light emitting diode by using the DC power supply as described in the above conventional example, it requires a step-down chopper circuit for stepping down an output voltage of the DC power supply before supplying the voltage. The step-down chopper circuit generally includes a switching element such that the output voltage of the DC power supply is stepped down by switching ON/OFF of the switching element.

In this case, when a short circuit failure occurs in the switching element, an overcurrent flows in the light source. Further, if the light source is destroyed due to the overcurrent, there is no problem even if the output voltage of the DC power supply is continuously applied between both ends of the light source. However, if the light source is not destroyed, the overcurrent continuously flows through the light source. Accordingly, the light source generates heat and a member or the like arranged around the light source increases in temperature, thereby causing an adverse effect such as melting of the member.

In an LED downlight using a light source constituted by, e.g., a light emitting diode, a reflecting plate is placed around the light source. The reflecting plate is made of various materials. If the reflecting plate is made of polybutylene terephthalate (PBT), its melting temperature is about 230° C. As described above, if the light source generates heat and a temperature therearound reaches the melting temperature, the reflecting plate is melted and deformed, which may result in a failure, e.g., failing to obtain desired light distribution characteristics.

SUMMARY OF THE INVENTION

In view of the above, the present invention provides a power supply capable of preventing an overcurrent from flowing through a light source when a short circuit failure occurs in a switching element of a step-down chopper unit.

In accordance with an aspect of the present invention, there is provided a power supply, including: a step-down chopper unit which includes a choke coil and a switching element to step down a DC voltage from a DC power source by switching ON/OFF of the switching element such that a voltage required for lighting is applied to a light source; a dimming control unit which controls driving of the switching element based on a dimming signal, and dims the light source by alternately repeating a switching ON period during which a drive signal having a frequency higher than that of the dimming signal is supplied to the switching element and a switching OFF period during which the supply of the drive signal to the switching element is stopped; an inrush current prevention unit which includes a parallel circuit of a thermistor having a positive temperature coefficient and a thyristor using as a drive voltage an induced voltage of a secondary winding of the choke coil, and prevents an inrush current occurring when the DC power source is turned on; and a compensation unit which applies a drive voltage to the thyristor in the switching OFF period.

The compensation unit may serve as a backup power source which is charged in the switching ON period.

Further, during the switching ON period, the compensation unit may stop the application of the drive voltage to the thyristor and a voltage induced in a secondary winding of the choke coil may be applied to the thyristor as the drive voltage.

The power supply may further include a short circuit detection unit for detecting a short circuit of the switching element, wherein, if the short circuit of the switching element is detected by the short circuit detection unit, the compensation unit stops applying the drive voltage to the thyristor.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
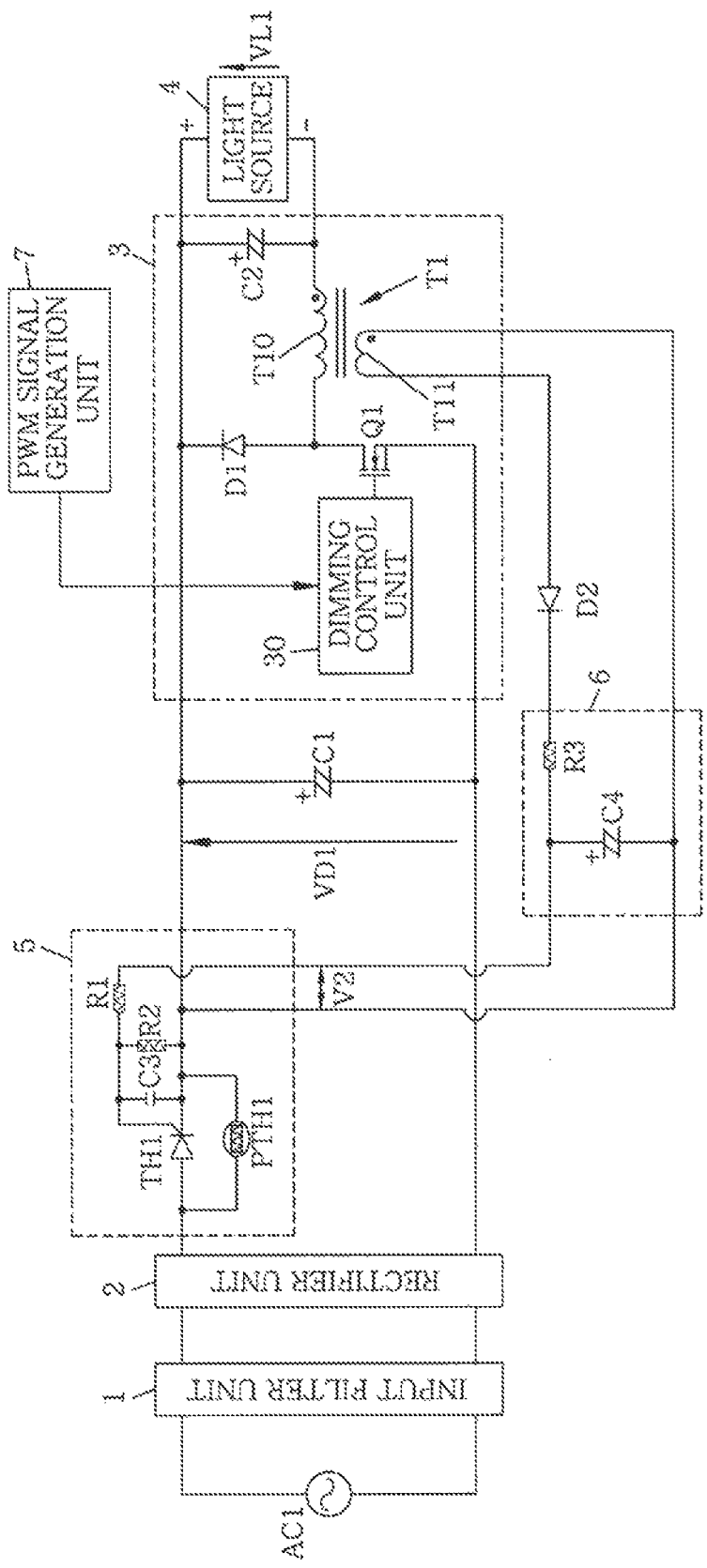
FIG. 1 is a circuit diagram schematically showing a power supply in accordance with a first embodiment of the present invention.

Hereinafter, embodiments of the present invention will be described in more detail with reference to accompanying drawings which form a part hereof. Throughout the drawings, like reference numerals will be given to like parts.

First Embodiment

A power supply in accordance with a first embodiment of the present invention will be described with reference to the accompanying drawings. The power supply of the present embodiment includes, as shown in FIG. 1, an input filter unit 1, a rectifier unit 2, a step-down chopper unit 3, a light source 4 including a light emitting diode (not shown), an inrush current prevention unit 5, a compensation unit 6, and a PWM signal generation unit 7.

The input filter unit 1 removes noise from an alternating current (AC) voltage outputted from an alternating current power source AC1.

The rectifier unit 2 includes, e.g., a diode bridge, and rectifies full wave of the AC voltage supplied from the alternating current power source AC1 through the input filter unit 1 to output a ripple voltage. A smoothing capacitor C1 is connected in parallel to output terminals of the rectifier unit 2 and smoothes the ripple voltage outputted from the rectifier unit 2 to output a direct current (DC) voltage VD1 (e.g., about 400 V). Thus, in this embodiment, a DC power source is constituted by the AC power source AC1, the rectifier unit 2 and the smoothing capacitor C1.

The step-down chopper unit 3 steps down the DC voltage VD1 across the smoothing capacitor C1 to output the stepped-down voltage. The step-down chopper unit 3 includes a series circuit of a diode D1 and a switching element Q1, and a series circuit of an electrolytic capacitor C2 and a primary winding T10 of a choke coil T1 connected in parallel to the diode D1. The light source 4 is connected in parallel between both ends of the electrolytic capacitor C2. In this embodiment, a MOSFET is used as the switching element Q1.

Figure 2:
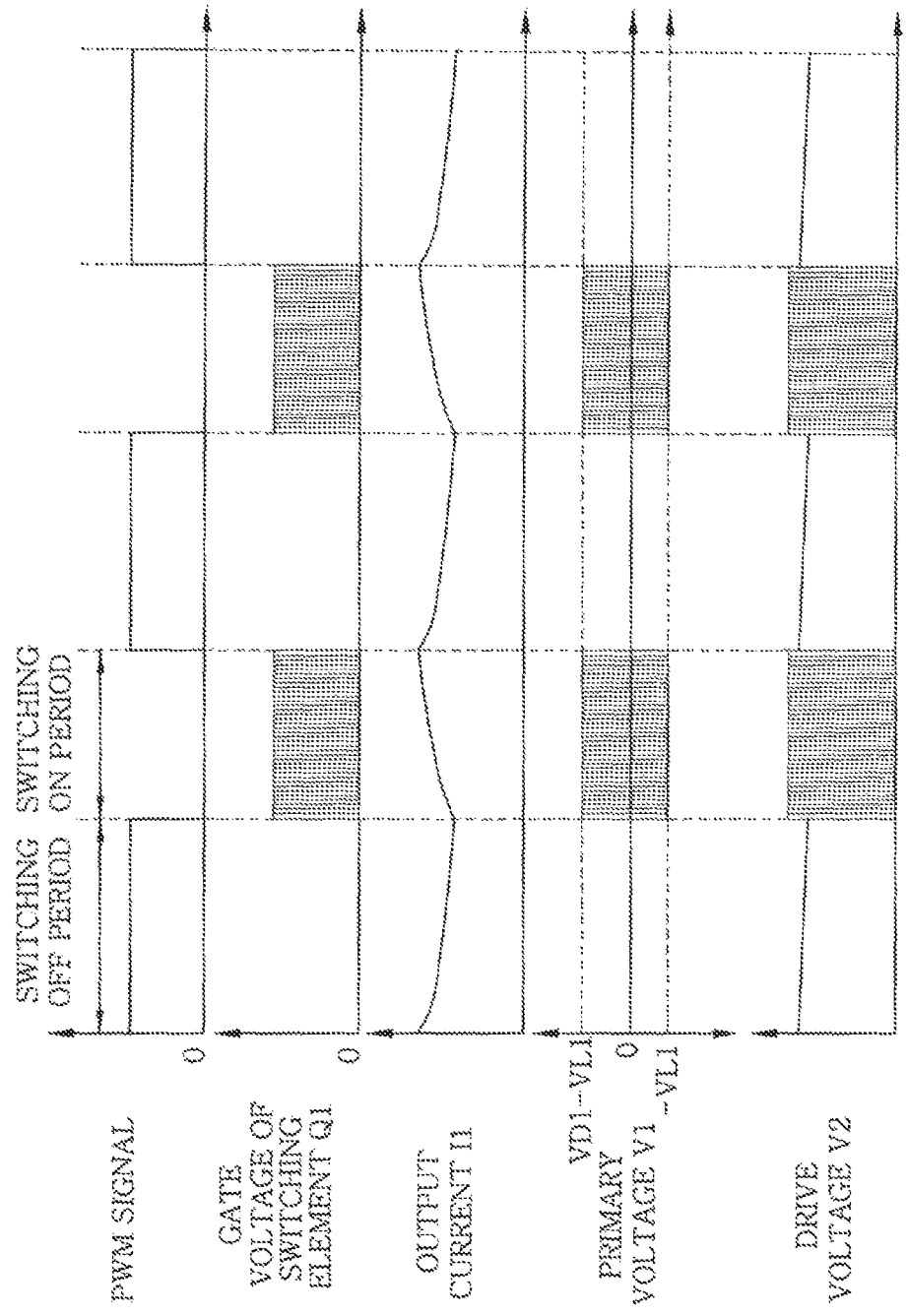
FIG. 2 is an operating waveform diagram in the power supply in accordance with the first embodiment of the present invention.

Further, the step-down chopper unit 3 includes a dimming control unit 30 which controls driving of the switching element Q1 in response to receiving a PWM signal having a frequency ranging, e.g., from several tens Hz to several hundreds Hz that is a dimming signal supplied from the PWM signal generation unit 7. The dimming control unit 30 supplies a drive signal having a high frequency, e.g., ranging from several kHz to several tens kHz to a gate terminal of the switching element Q1 for a period during which the PWM signal has a low level, as shown in FIG. 2, such that the switching element Q1 is oscillated at a high frequency. The period during which the PWM signal has a low level is referred to as "switching ON period", hereinafter.

For a period during which the PWM signal has a high level, the dimming control unit 30 stops the supply of the drive signal to the gate terminal of the switching element Q1. Accordingly, the switching element Q1 stops the high frequency oscillation. The period during which the PWM signal has a high level is referred to as "switching OFF period" below.

In the switching ON period, since the DC voltage VD1 is applied to the light source 4 from the smoothing capacitor C1, an output current I1 flowing through the light source 4 increases with the lapse of time (see FIG. 2). On the other hand, in the switching OFF period, since only a voltage across the electrolytic capacitor C2 is applied to the light source 4, the output current I1 flowing through the light source 4 decreases with the lapse of time (see FIG. 2). Further, the amount of the increase or decrease in the output current I1 depends on the capacitance of the electrolytic capacitor C2. By alternately repeating the switching ON period and the switching OFF period, the light source 4 maintains a lighting state.

Herein, if an on-duty ratio of the PWM signal increases, the switching ON period decreases, thereby reducing the output current I1. On the contrary, if the on-duty ratio of the PWM signal decreases, the switching ON period increases, thereby increasing the output current I1. Thus, by appropriately changing the on-duty ratio of the PWM signal, it is possible to increase or decrease the output current I1 supplied to the light source 4, thereby dimming the light source 4 at a desired light output level.

The inrush current prevention unit 5 includes a parallel circuit of a thyristor TH1 and a positive type thermistor PTH1 having a positive temperature coefficient. The parallel circuit is connected between the rectifier unit and the smoothing capacitor C1. Inputted to a gate terminal of the thyristor TH1 is an output voltage of an integrating circuit consisting of resistors R1 and R2 and a capacitor C3.

Connected to an input terminal of the integrating circuit is a secondary winding T11 of the choke coil T1 of the step-down chopper unit 3 via a diode D2. An induced voltage of the secondary winding T11 is inputted to the gate terminal of the thyristor TH1 through the integrating circuit. Therefore, the induced voltage of the secondary winding T11 inputted to the integrating circuit via the diode D2 serves as a drive voltage V2 of the thyristor TH1.

Hereinafter, an operation of this embodiment will be described with reference to the drawings. First, when the supply of the AC power source AC1 commences, a current flows through the thermistor PTH1 because the thyristor TH1 is not driven at this point. Further, since the current flows through the thermistor PTH1, charging the smoothing capacitor C1 is suppressed, thereby preventing an inrush current occurring when the power supply is turned on.

Then, when a control power source (not shown) is inputted to the dimming control unit 30, the dimming control unit 30 controls the driving of the switching element Q1 based on the PWM signal from the PWM signal generation unit 7, and the step-down chopper unit 3 begins to operate. Thus, a voltage required for lighting is applied to the light source 4, and the light source 4 is turned on.

In the switching ON period, the drive signal is supplied to the switching element Q1, and the step-down chopper unit 3 performs a switching operation. Accordingly, a pulse-shaped primary voltage V1 is applied to the primary winding T10 of the choke coil T1 as shown in FIG. 2. Further, when the switching element Q1 is turned on, the primary voltage V1 becomes a difference VD1−VL1 between the DC voltage VD1 and a load voltage VL1 applied to the light source 4. On the other hand, when the switching element Q1 is turned off, a counter electromotive force is generated in the primary winding T10, and the primary voltage V1 becomes substantially equal to −VL1.

In this case, an induced voltage is generated in the secondary winding T11 of the choke coil T1 according to a ratio of the turns of the primary winding T10 to that of the secondary winding T11, and the induced voltage is inputted to the compensation unit 6 (operation of the compensation unit will be described later) and the inrush current prevention unit 5 via the diode D2. At this time, only when the switching element Q1 is in an OFF state during a normal lighting state of the light source 4 as shown in FIG. 2, a drive voltage V2 is applied to the thyristor TH1. In the switching ON period, since the thyristor TH1 is conducted using the induced voltage of the secondary winding T11 as a drive voltage, the current flows without passing through the thermistor PTH1.

Next, an operation when a short circuit failure occurs in the switching element Q1 will be described. If a short circuit failure occurs between the drain and source of the switching element Q1, the switching element Q1 remains in the ON state regardless of the drive signal from the dimming control unit 30, and the step-down chopper unit 3 stops the switching operation. Thus, since no voltage is applied to the primary winding T10, the primary voltage V1 becomes almost zero. Accordingly, no voltage is induced in the secondary winding T11, and the drive voltage V2 also becomes almost zero. Consequently, the thyristor TH1 becomes a non-conducting state. Therefore, the current flows through the thermistor PTH1.

When the current continuously flows through the thermistor PTH1, the temperature of the thermistor PTH1 increases, and its resistance value increases significantly. Accordingly, since most of the ripple voltage obtained by full-wave rectifying the AC voltage by the rectifier unit 2 is applied to the thermistor PTH1, the output voltage of the step-down chopper unit 3 is reduced, and the voltage required for lighting cannot be applied to the light source 4. Thus, since the state of the light source 4 is switched to a non-lighting state, it is possible to prevent an overcurrent from flowing through the light source 4, thereby preventing heat generation.

Figure 3:
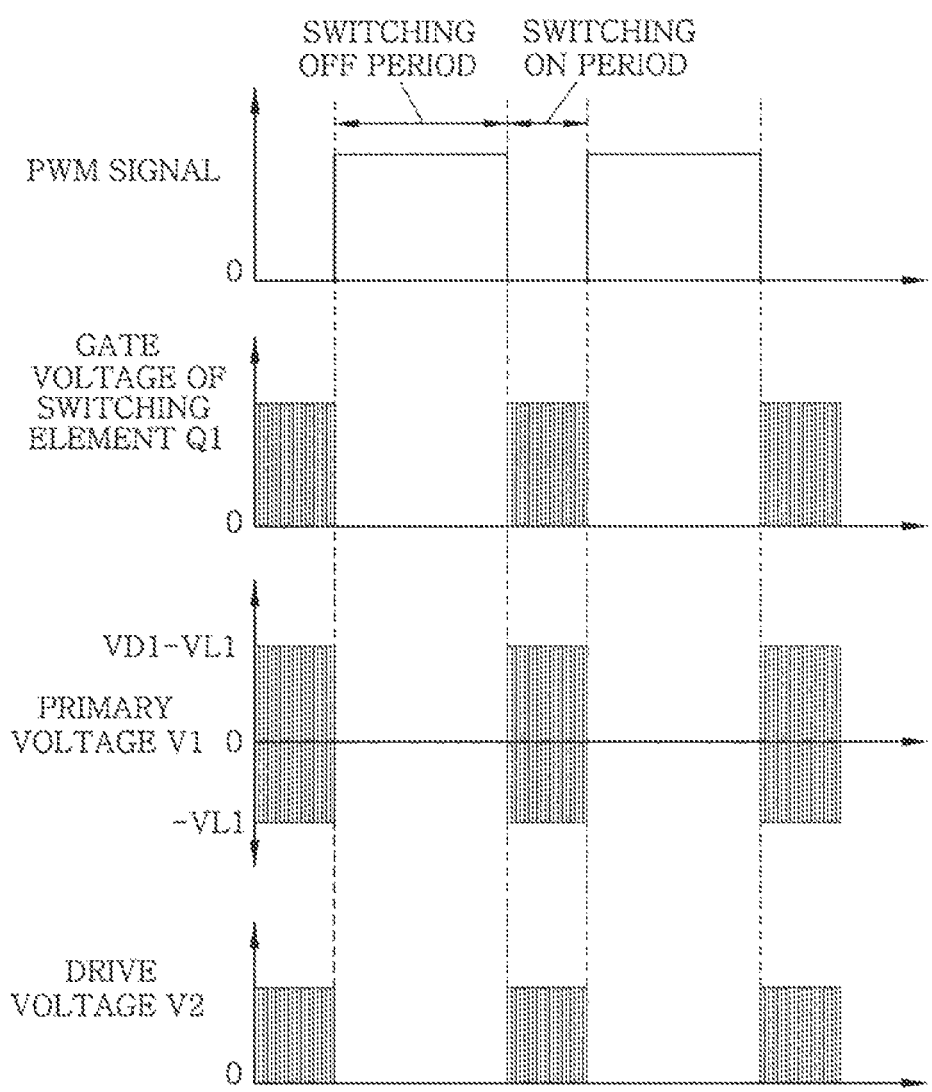
FIG. 3 is an operating waveform diagram in the power supply when a compensation unit is not provided.

As described above, if the compensation unit 6 is not provided, there is an effect of preventing the overcurrent from flowing through the light source 4 during the short circuit failure of the switching element Q1, but the following problem may occur. That is, the drive signal is not supplied to the switching element Q1 in the switching OFF period, and the step-down chopper unit 3 does not perform the switching operation. Accordingly, as shown in FIG. 3, no voltage is applied to the primary winding T10, and no voltage is induced in the secondary winding T11. Further, the drive voltage V2 becomes almost zero, so that the thyristor TH1 becomes a non-conducting state.

Then, since the current flows through the thermistor PTH1, the resistance value of the thermistor PTH1 increases and power consumption also increases. Accordingly, the circuit efficiency is lowered. Further, as the resistance value of the thermistor PTH1 increases, the voltage applied to the thermistor PTH1 also increases. As a result, since the output voltage of the step-down chopper unit 3 is reduced, the state of the light source 4 may be switched to the non-lighting state.

In this embodiment, therefore, the compensation unit 6 is provided to solve the above problem. The compensation unit 6 is, as shown in FIG. 1, an integrating circuit including a resistor R3 and a capacitor C4. Further, the compensation unit 6 is provided between the secondary winding T11 and the inrush current prevention unit 5. A time constant of the integrating circuit is set such that the drive voltage V2 is maintained to be equal to or greater than a predetermined value in the switching OFF period.

Hereinafter, an operation of the compensation unit 6 will be described. First, in the switching ON period, the capacitor C4 of the compensation unit 6 is charged by the induced voltage of the secondary winding T11. In this case, a charging voltage of the capacitor C4 is equal to or greater than a voltage required for driving the thyristor TH1. Accordingly, the thyristor TH1 is conducted and the current flows without passing through the thermistor PTH1.

In the switching OFF period, no voltage is induced in the secondary winding T11, but as shown in FIG. 2, the charging voltage of the capacitor C4 is applied as the drive voltage V2 to the thyristor TH1, so that the thyristor TH1 maintains a conducting state. That is, the compensation unit 6 is charged in the switching ON period, and serves as a backup power source for applying the drive voltage V2 to the thyristor in the switching OFF period.

As the above, by providing the compensation unit 6, it is possible to maintain the conducting state of the thyristor TH1 in any period of the switching ON period and the switching OFF period. Accordingly, since no current flows through the thermistor PTH1 in the switching OFF period unlike a case where the compensation unit 6 is not provided, it is possible to solve the problems such as an increase in power consumption or switching of the light source 4 to the non-lighting state.

With the present embodiment, by using the voltage induced in the secondary winding T11 of the choke coil T1 of the step-down chopper unit 3, it is possible to prevent the overcurrent from flowing through the light source 4 during the short circuit failure of the switching element Q1 of the step-down chopper unit 3. Further, by providing the compensation unit 6, it is possible to maintain the conducting state of the thyristor TH1 of the inrush current prevention unit 5 even in the switching OFF period.

In the present invention, the inrush current prevention unit 5 also includes the integrating circuit consisting of the resistors R1 and R2 and the capacitor C3, but a voltage (as low as about 1 V) divided by the resistors R1 and R2 is applied to the thyristor TH1. Therefore, the inrush current prevention unit 5 does not substantially serve as a backup power source.

On the other hand, the compensation unit 6 serves effectively as a backup power source because the capacitor C4 of the compensation unit 6 is charged by the induced voltage of the secondary winding T11, i.e., the voltage which is not divided by the resistors R1 and R2, and a charging voltage of the capacitor C4 is maintained to become equal to or greater than a predetermined value for the switching OFF period.

Second Embodiment

Hereinafter, a power supply in accordance with a second embodiment of the present invention will be described with reference to the drawings. A basic configuration of this embodiment is the same as that of the first embodiment, the same reference numerals are assigned to the same components, and a description thereof will be omitted.

Figure 4:
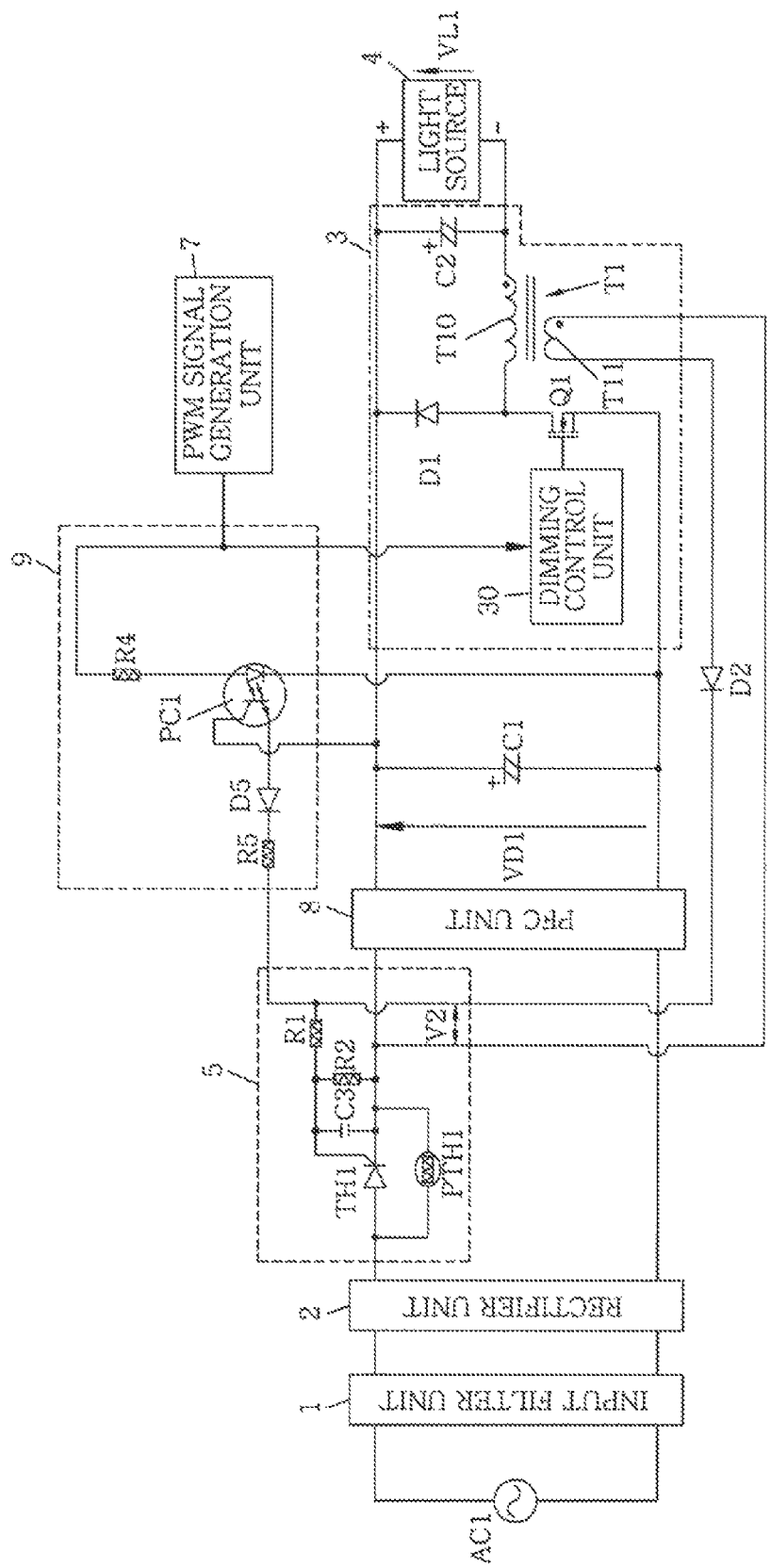
FIG. 4 is a circuit diagram schematically showing a power supply in accordance with a second embodiment of the present invention.

In this embodiment, as shown in FIG. 4, a power factor correction (PFC) unit 8 for power factor improvement is connected between the inrush current prevention unit 5 and the smoothing capacitor C1. Further, a compensation unit 9 is provided instead of the compensation unit 6, the compensation unit 9 being driven by a PWM signal from the PWM signal generation unit 7. Further, since the PFC unit 8 is conventionally well known, a description thereof will be omitted.

The compensation unit 9 includes a photocoupler PC1 having a light emitting diode at a primary side thereof, and a phototransistor at a secondary side thereof. The PWM signal is inputted to the light emitting diode of the photocoupler PC1 from the PWM signal generation unit 7 via a resistor R4, and a series circuit of a resistor R5 and a diode D5 is connected to the phototransistor of the photocoupler PC1. In the secondary side phototransistor, a collector terminal is connected to a high voltage side terminal of the smoothing capacitor C1, and an emitter terminal is connected to an anode of the diode D5.

Figure 5:
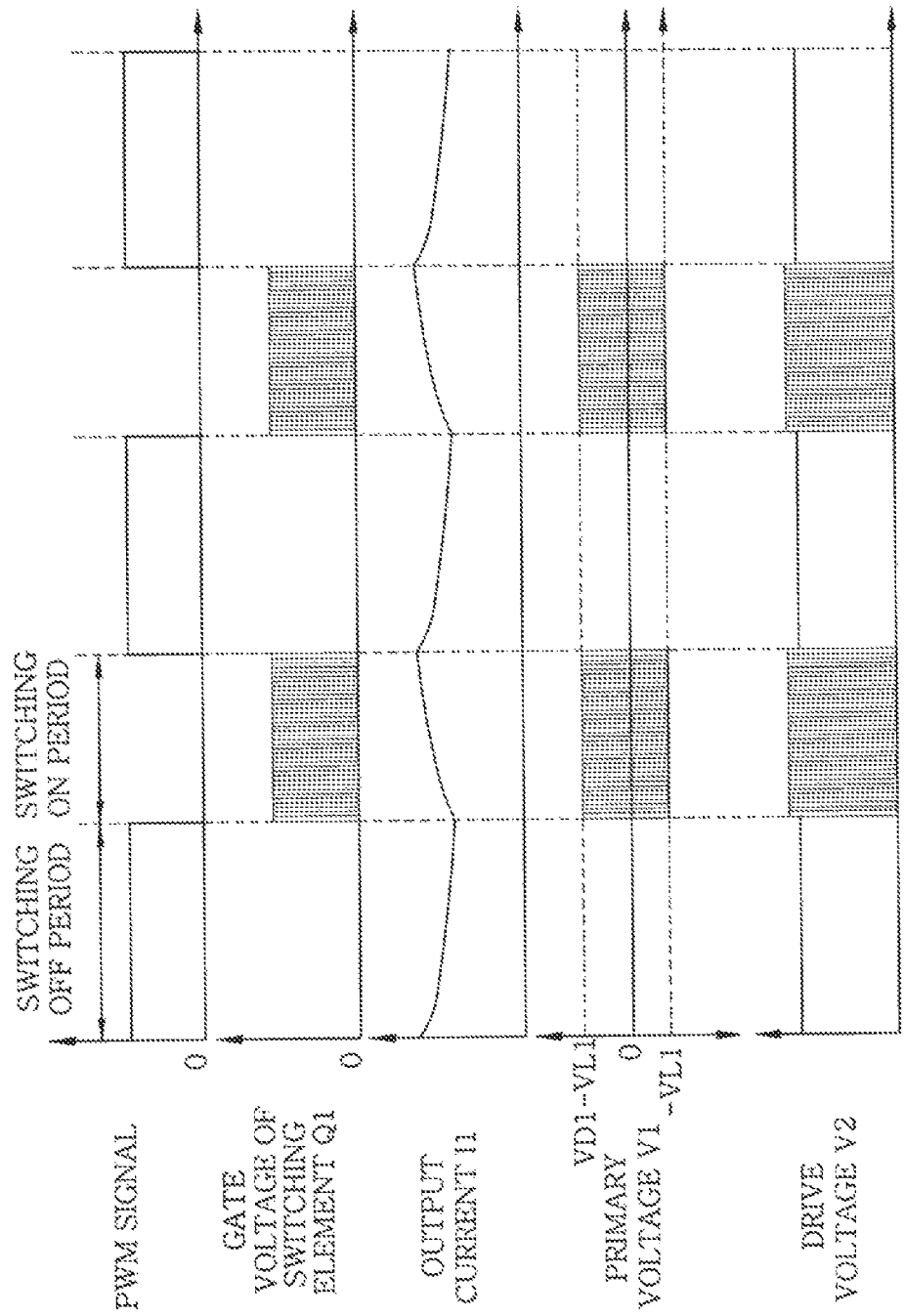
FIG. 5 is an operating waveform diagram in the power supply in accordance with the second embodiment of the present invention.

Next, an operation of the compensation unit 9 will be described with reference to the drawings. First, in the switching OFF period, as shown in FIG. 5, since the PWM signal has a high level, the primary side light emitting diode of the photocoupler PC1 is conducted to emit light. By receiving the light, conduction is made between the collector and emitter of the secondary side phototransistor, so that the DC voltage VD1 is applied to the integrating circuit of the inrush current prevention unit 5 through the diode D5 and the resistor R5. Thus, in the switching OFF period, the compensation unit 9 is driven and the drive voltage V2 is applied to the thyristor TH1, thereby maintaining the thyristor TH1 in the conducting state.

Further, in the switching ON period, since the induced voltage of the secondary winding T11 is applied as the drive voltage V2 to the thyristor TH1, the thyristor TH1 maintains the conducting state. In this case, since the PWM signal has a low level as shown in FIG. 5, the primary side light emitting diode of the photocoupler PC1 is not conducted and the compensation unit 9 is not driven.

With this embodiment, in the switching OFF period, the drive voltage V2 is applied to the thyristor TH1 of the inrush current prevention unit 5 by using the compensation unit 9. Thus, it is possible to maintain the conducting state of the thyristor TH1 even during the switching OFF period.

Further, in this embodiment, when a short circuit failure occurs in the switching element Q1, the drive voltage V2 is applied to the thyristor TH1 from the compensation unit 9 in the high-level period of the PWM signal, but the compensation unit 9 is not driven in the low-level period of the PWM signal. Accordingly, in the high-level period of the PWM signal, the current flows without passing through the thermistor PTH1, whereas the current flows through the thermistor PTH1 in the low-level period of the PWM signal. Thus, it is possible to achieve an effect of preventing the overcurrent from flowing through the light source 4.

Furthermore, in this embodiment, although the PWM signal from the PWM signal generation unit 7 is used as a drive voltage of the compensation unit 9, a power source synchronized with the PWM signal may be separately provided such that a voltage of the power source is used as a drive voltage of the compensation unit 9.

Third Embodiment

Figure 6:
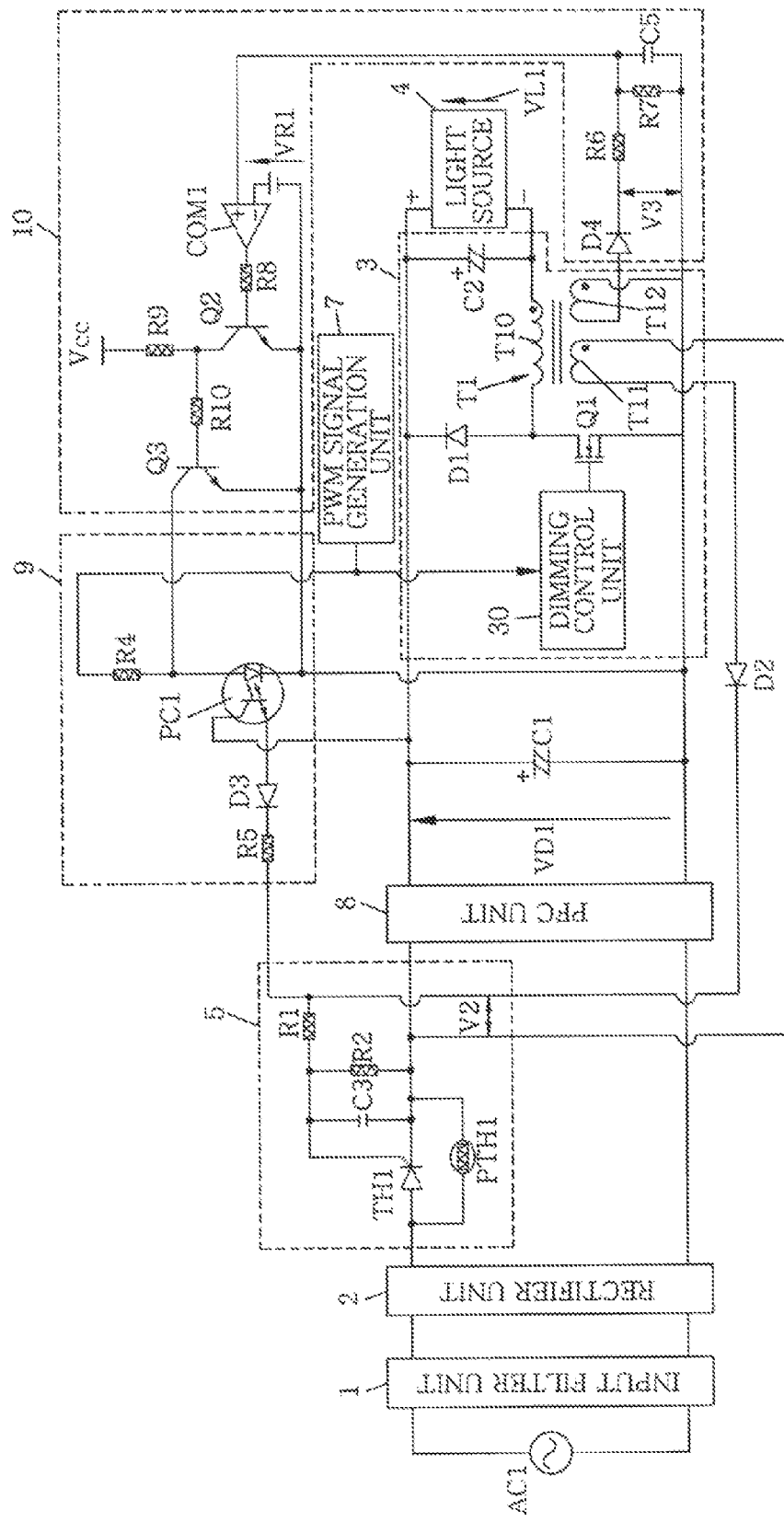
FIG. 6 is a circuit diagram schematically showing a power supply in accordance with a third embodiment of the present invention.

Hereinafter, a power supply in accordance with a third embodiment of the present invention will be described with reference to the drawings. A basic configuration of this embodiment is the same as that of the second embodiment, the same reference numerals are assigned to the same components, and a description thereof will be omitted. In this embodiment, as shown in FIG. 6, a short circuit detection unit 10 is provided to detect a short circuit of the switching element Q1 of the step-down chopper unit 3.

The short circuit detection unit 10 includes a comparator COM1 and has an input voltage that is a detection voltage V3 induced in a tertiary winding T12 of the choke coil T1 of the step-down chopper unit 3. Connected to a non-inverting input terminal of the comparator COM1 are a diode D4, and an integrating circuit including resistors R6 and R7 and a capacitor C5. A voltage across the capacitor C5 is inputted to the non-inverting input terminal of the comparator COM1, and is compared to a reference voltage VR1 that is inputted to an inverting input terminal of the comparator COM1.

An output terminal of the comparator COM1 is connected via a resistor R8 to a base terminal of a switching element Q2 that is an NPN type transistor. Connected to a collector terminal of the switching element Q2 is a voltage source Vcc via a resistor R9. Also, a base terminal of a switching element Q3 that is an NPN type transistor is connected to the collector terminal of the switching element Q2 via a resistor R10. A collector terminal of the switching element Q3 is connected to a junction between the resistor R4 and the primary side light emitting diode of the photocoupler PC1 in the compensation unit 9.

Figure 7:
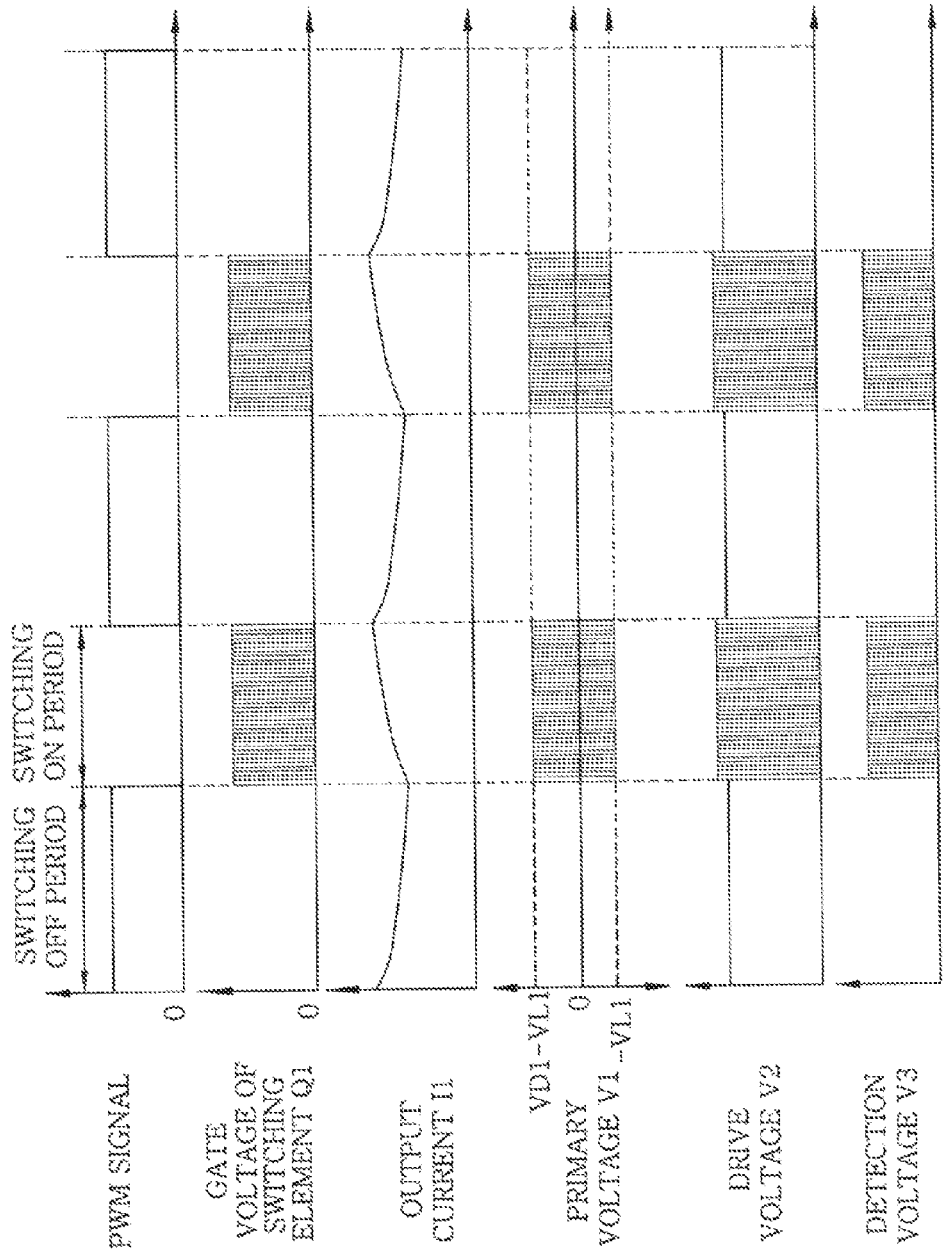
FIG. 7 is an operating waveform diagram in the power supply in accordance with the third embodiment of the present invention.
Figure 8:
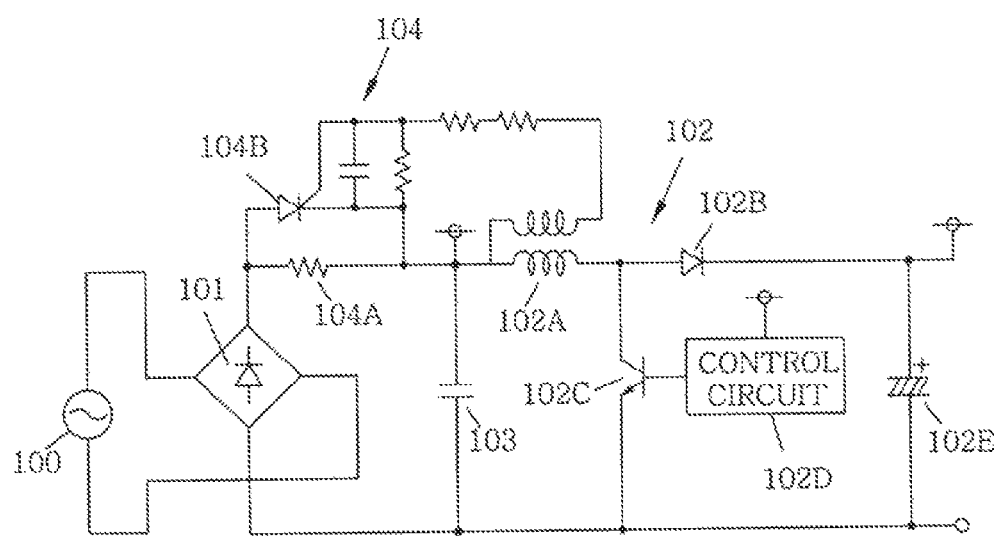
FIG. 8 is a circuit diagram schematically showing a conventional DC power supply.

Next, an operation of the short circuit detection unit 10 will be described with reference to the drawings. First, in the switching ON period, the drive signal is supplied to the switching element Q1, and the step-down chopper unit 3 performs the switching operation. Accordingly, the detection voltage V3 having a pulse shape is induced in the tertiary winding T12 of the choke coil T1 as shown in FIG. 7. The detection voltage V3 is inputted to the integrating circuit including the resistors R6 and R7 and the capacitor C5 via the diode D4 in the short circuit detection unit 10. Then, the detection voltage V3 is smoothed and inputted to the non-inverting input terminal of the comparator COM1.

Further, when a charging voltage of the capacitor C5 exceeds the reference voltage VR1, an output signal of the comparator COM1 becomes a high level. Accordingly, since the switching element Q2 is turned on and the switching element Q3 is switched off, the PWM signal from the PWM signal generation unit 7 is supplied to the primary side diode of the photocoupler PC1 of the compensation unit 9.

Further, in the switching OFF period, since the drive signal is not supplied to the switching element Q1 of the step-down chopper unit 3, the switching operation of the step-down chopper unit 3 is stopped. Therefore, as shown in FIG. 7, since no voltage is applied to the primary winding T10, no voltage is induced in the tertiary winding T12 and the detection voltage V3 becomes almost zero.

In this case, a time constant of the integrating circuit including the resistors R6 and R7 and the capacitor C5 of the short circuit detection unit 10 is set such that the charging voltage of the capacitor C5 charged during the switching ON period exceeds the reference voltage VR1 for the next switching OFF period. Accordingly, even in the switching OFF period, the charging voltage of the capacitor C5 exceeds the reference voltage VR1, and the output signal of the comparator COM1 becomes a high level. Thus, as described above, the PWM signal from the PWM signal generation unit 7 is supplied to the primary side diode of the photocoupler PC1 in the compensation unit 9.

In other words, since the compensation unit 9 is driven in the same manner as in the second embodiment while the light source 4 is in the normal lighting state, it is possible to maintain the conducting state of the thyristor TH1 of the inrush current prevention unit 5 even during the switching OFF period.

In the meantime, if a short circuit failure occurs in the switching element Q1, the switching element Q1 remains in the ON state regardless of the drive signal from the dimming control unit 30, and the step-down chopper unit 3 stops the switching operation. Thus, since no voltage is applied to the primary winding T10, the primary voltage V1 becomes almost zero. Accordingly, since no voltage is induced in the tertiary winding T12, the detection voltage V3 also becomes almost zero.

If the switching element Q1 maintains the short circuit state for more than a predetermined time, the capacitor C5 is discharged and its charging voltage is below the reference voltage VR1. Accordingly, the output signal of the comparator COM1 becomes a low level. Further, the switching element Q2 is switched off, and the switching element Q3 is switched on. As a result, the supply of the PWM signal to the primary side diode of the photocoupler PC1 of the compensation unit 9 is cut off. Thus, the drive voltage V2 is no longer applied to the thyristor TH1 from the compensation unit 9.

At this point, since the drive voltage V2 is also not induced in the secondary winding T11, the thyristor TH1 becomes the non-conducting state, and the current flows through the thermistor PTH1. When the current continuously flows through the thermistor PTH1, the temperature of the thermistor PTH1 increases, and the resistance value thereof increases significantly. Accordingly, since most of the ripple voltage obtained by full-wave rectifying the AC voltage by the rectifier unit 2 is applied to the thermistor PTH1, the output voltage of the step-down chopper unit 3 is reduced, and the voltage required for lighting cannot be applied to the light source 4. Therefore, since the state of the light source 4 is switched to the non-lighting state, it is possible to prevent the overcurrent from flowing through the light source 4, thereby preventing heat generation.

As described above, in this embodiment, the drive voltage V2 is applied to the thyristor TH1 of the inrush current prevention unit 5 by using the compensation unit 9 in the switching OFF period. Thus, it is possible to maintain the conducting state of the thyristor TH1 even during the switching OFF period. Further, in this embodiment, the short circuit of the switching element Q1 of the step-down chopper unit 3 can be detected by the short circuit detection unit 10 to thereby stop the driving of the compensation unit 9. As a result, it is possible to prevent the drive voltage V2 from being applied to the thyristor TH1 from the compensation unit 9 in the high level period of the PWM signal. Consequently, it is possible to further increase the effect of preventing the overcurrent from flowing through the light source 4 compared to the second embodiment.

While the invention has been shown and described with respect to the embodiments, it will be understood by those skilled in the art that various changes and modification may be made without departing from the scope of the invention as defined in the following claims.

What is claimed is:

1. A power supply, comprising:
    a step-down chopper unit which includes a choke coil and a switching element to step down a DC voltage from a DC power source by switching ON/OFF of the switching element such that a voltage required for lighting is applied to a light source;
    a dimming control unit which controls driving of the switching element based on a dimming signal, and dims the light source by alternately repeating a switching ON period during which a drive signal having a frequency higher than that of the dimming signal is supplied to the switching element and a switching OFF period during which the supply of the drive signal to the switching element is stopped;
    an inrush current prevention unit which includes a parallel circuit of a thermistor having a positive temperature coefficient and a thyristor using as a drive voltage an induced voltage of a secondary winding of the choke coil, and prevents an inrush current occurring when the DC power source is turned on; and
    a compensation unit which applies a drive voltage to the thyristor in the switching OFF period.

2. The power supply of claim 1, wherein the compensation unit serves as a backup power source which is charged in the switching ON period.

3. The power supply of claim 2, further comprising a short circuit detection unit for detecting a short circuit of the switching element, wherein, if the short circuit of the switching element is detected by the short circuit detection unit, the compensation unit stops applying the drive voltage to the thyristor.

4. The power supply of claim 1, wherein, during the switching ON period, the compensation unit stops the application of the drive voltage to the thyristor and a voltage induced in a secondary winding of the choke coil is applied to the thyristor as the drive voltage.

5. The power supply of claim 4, further comprising a short circuit detection unit for detecting a short circuit of the switching element, wherein, if the short circuit of the switching element is detected by the short circuit detection unit, the compensation unit stops applying the drive voltage to the thyristor.

6. The power supply of claim 1, further comprising a short circuit detection unit for detecting a short circuit of the switching element, wherein, if the short circuit of the switching element is detected by the short circuit detection unit, the compensation unit stops applying the drive voltage to the thyristor.

* * * * *